C. E. JOHANSSON.
ADJUSTMENT DEVICE FOR THE MEASURING SPINDLES OF MICROMETERS,
MEASURING MACHINES, AND THE LIKE.
APPLICATION FILED DEC. 2, 1918.
1,431,583.
Patented Oct. 10, 1922.
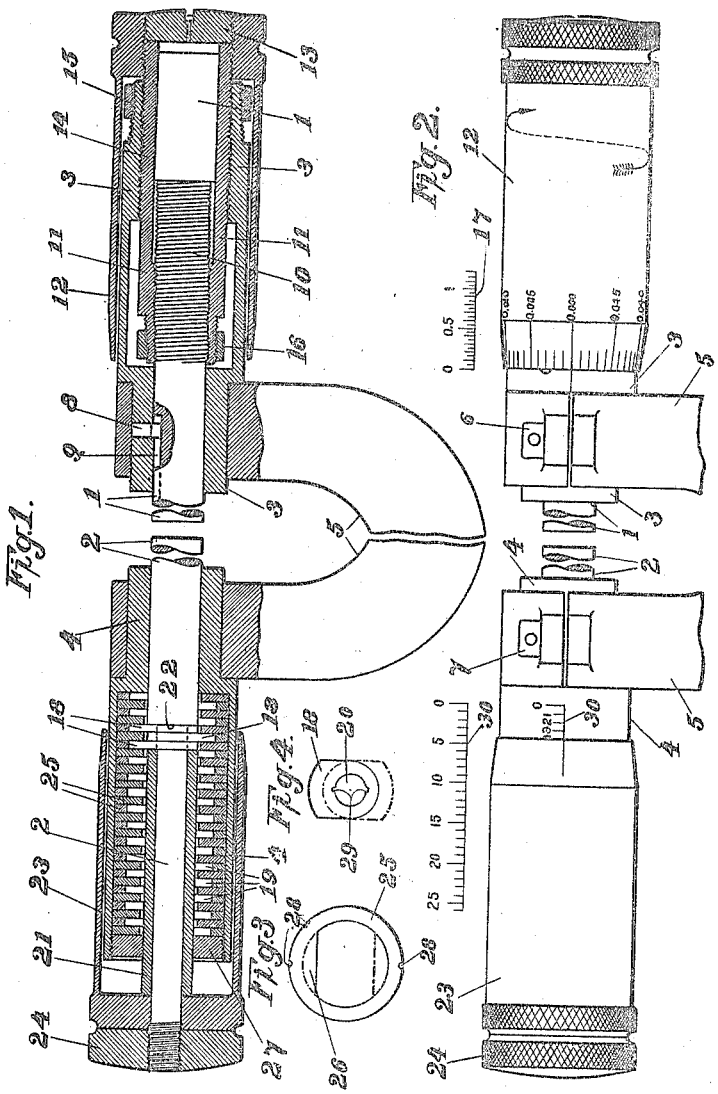
Inventor:
CARL EDVARD JOHANSSON
By George Bayard Jones atty.

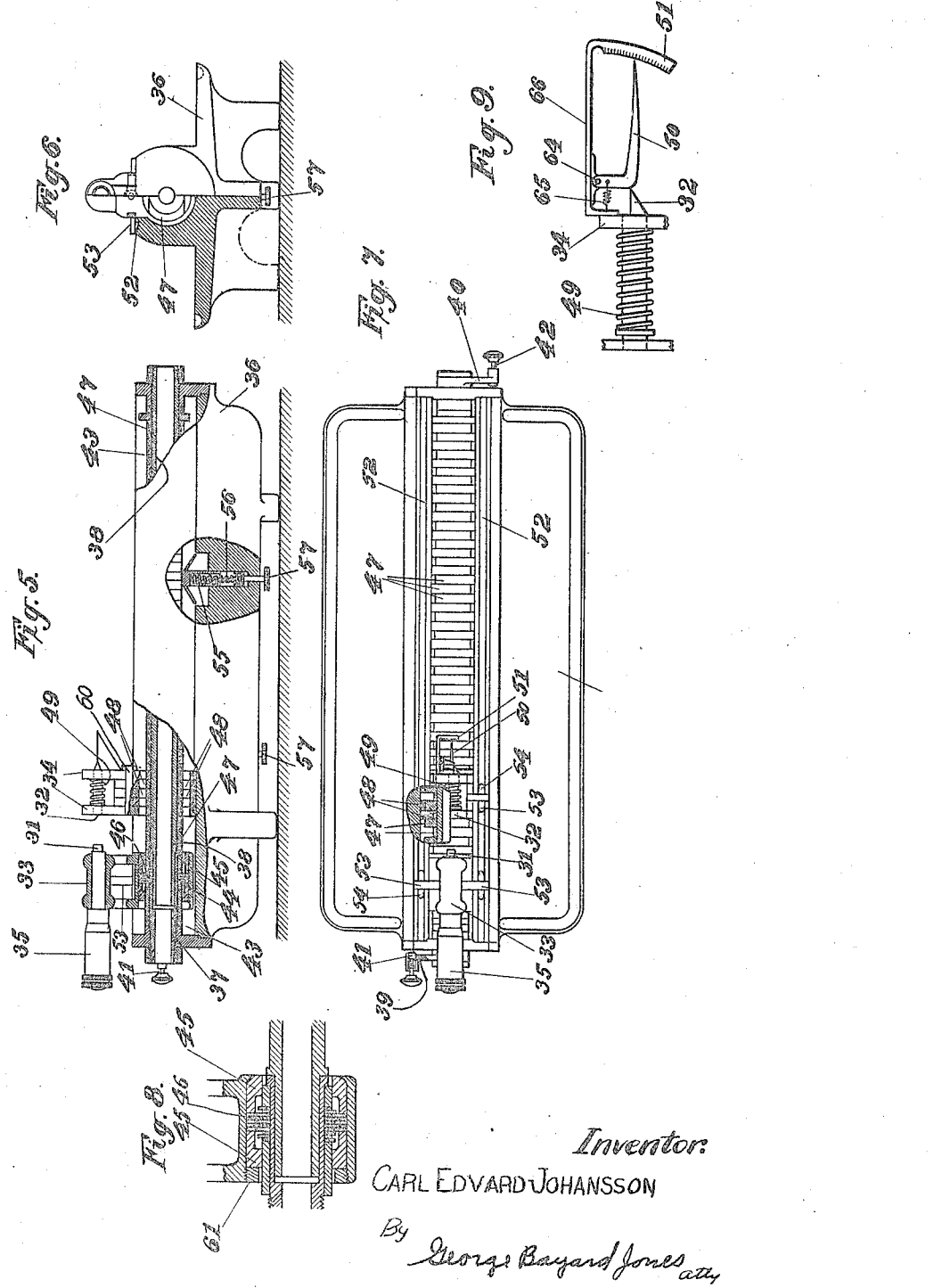

Patented Oct. 10, 1922.

1,431,583

UNITED STATES PATENT OFFICE.

CARL EDVARD JOHANSSON, OF ESKILSTUNA, SWEDEN.

ADJUSTMENT DEVICE FOR THE MEASURING SPINDLES OF MICROMETERS, MEASURING MACHINES, AND THE LIKE.

Application filed December 2, 1918. Serial No. 264,997.

*To all whom it may concern:*

Be it known that I, CARL EDVARD JOHANSSON, a subject of the King of Sweden, residing at Eskilstuna, in the Kingdom of Sweden, have invented a new and useful Improvement in Adjustment Devices for the Measuring Spindles of Micrometers, Measuring Machines, and the like, of which the following is a specification.

The present invention relates to an adjustment device for the measuring spindles of micrometers, measuring machines, and the like in which the longitudinally movable measuring spindle is adjustable into different definite positions.

It has already been proposed to provide the anvil-spindle of micrometer-calipers with lugs co-operating with a corresponding notch in the guide of the spindle on the principle of a bayonet-lock, so that the measuring range of the micrometer may be varied by adjustment of the anvil-spindle. For effecting in this manner an accurate adjustment of the anvil-spindle, however, it is of course necessary that the lugs and the notch have exactly the same width so that when they are in engagement with one another, the anvil-spindle is completely prevented from even the very slightest movement in its longitudinal direction. In practice, however, it is very difficult to make the lugs and the notches of the necessary accurate width and shape when, as in the old adjustment device of this type, the lugs are made integral with the spindle, and the notch is made directly in the guide.

The purpose of the present invention is to avoid the said difficulty and to provide an adjustment device of the kind referred to by means of which an adjustment of the anvil-spindle sufficiently accurate for even the very finest and accurate measuring tools is rendered possible. For this purpose the invention is broadly characterized by this that the lugs, or the notches, or both the lugs and the notches are formed by plane disks, or end measuring blocks, placed in a row abutting one another and having equal thickness but different shape or positions. These disks are made with plane and accurately parallel surfaces similar to the inventor's well-known combinable end measuring blocks, and when placed together they form a combination end measure with accurately fixed stops which determine the various positions of the anvil-spindle. Accordingly, the present adjustment device is particularly adapted for micrometer-calipers with a differential screw and for accurate measuring machines. By the described combination of the parts of the bayonet-lock the advantage is also gained that disks which have been damaged or worn by long use, may easily be exchanged.

In the accompanying drawings a few embodiments of the invention are shown by way of example. Fig. 1 shows a longitudinal section to enlarged scale of a micrometer with a differential screw and with an adjustment device according to the present invention, and Fig. 2 shows an elevation of the micrometer. Figs. 3 and 4 show details of the adjustment device. Figs. 5 to 7 show an accurate measuring machine provided with adjustment devices according to the invention, Fig. 5 showing an elevation, Fig. 6 an end view, and Fig. 7 a plan view of the machine, said views being partially in section, Fig. 8 is an enlarged sectional view of a part of the device shown in Fig. 5; and Fig. 9 is a view on a larger scale of a bearing pressure indicating device.

The micrometer illustrated in Figs. 1 to 4 is provided in the usual manner with two measuring spindles 1 and 2 placed opposite one another, the former of which is adjusted by means of a differential screw in a well-known manner, that is to say by means of two screws having different pitches, the adjustment of the measuring spindle 2 being effected by means of an adjustment device according to the present invention. The measuring spindles 1 and 2 are movable longitudinally in guide sleeves 3 and 4, which sleeves are removably mounted in the frame 5 of the micrometer, the said frame being provided with bores having split walls, as shown in Fig. 2, into which bores the sleeves 3 and 4 may be introduced and secured by tightening the jam screws 6 and 7.

The measuring spindle 1 is movable longitudinally but is not rotatable in its guide sleeve 3, the rotation of the spindle being prevented by a pin 8 secured in the wall of the sleeve, which pin engages a longitudinal groove 9 in the spindle 1. The measuring spindle 1 is provided with a screw thread 10 engaging an interior screw thread in a sleeve 11. This sleeve 11 which is rigidly secured to the measuring drum 12 by means of a threaded jam plug 13, is also provided with an exterior screw thread 14 engaging an interior screw thread in the stationary guide sleeve 3. This last mentioned sleeve 3, as well as the sleeve 11, is slotted in a well-known manner, though not shown in the drawing, and each of said sleeves is provided with a slightly conical jam nut 15, and 16 respectively, in order to provide against lost motion in the threads. The interior screw thread of the guide sleeve 3 and the exterior screw thread 14 of the sleeve 11 which threads engage one another, have of course equal pitch, and the interior screw thread of the sleeve 11 and the screw thread 10 of the measuring spindle have also equal pitch. On the other hand, the exterior screw thread 14 and the interior screw thread of the sleeve 11 have different pitches, the first named thread having the greater pitch in the embodiment illustrated in which all screw threads are right-hand threads.

In the drawing it has been assumed that the measuring spindle 1 occupies its zero position, thus protruding its greatest distance to the left from the guide sleeve 3. Now, if it is desired to retract the measuring spindle 1 to the right it is only necessary in the usual manner to turn the measuring drum 12 in the direction indicated by the arrow in Fig. 2, the sleeve 11 rigidly connected to the measuring drum taking part in this movement. Owing to the engagement between the exterior thread 14 of the sleeve 11 and the interior thread of the stationary guide sleeve 3, however, the sleeve 11 is simultaneously moved to the right and, the measuring spindle 1 being prevented from turning, the sleeve 11 will also turn around the measuring spindle. If it be assumed that the pitch of the exterior thread 14 and thus also of the interior thread of the sleeve 3 is 0.5 mm., the sleeve 11 will thus be moved 0.5 mm. to the right on each rotation of the measuring drum 12. If, for instance, the pitch of the interior thread of the sleeve 11 and thus also of the thread 10 of the spindle 1 was equal to naught, the measuring spindle 1 would of course also be moved 0.5 mm. to the right on each rotation of the measuring drum 12. On the other hand, if the pitch of the interior thread of the sleeve 11 and of the thread 10 was also 0.5 mm. there would be no movement of the measuring spindle. In the instance shown, however, the pitch of the interior thread of the sleeve 11 and of the thread of the measuring spindle is 0.45 mm., consequently on each full rotation of the measuring drum 12 in the direction indicated by the arrow in Fig. 2 the spindle 1 will be moved a distance equal to the difference between the pitches, that is to say 0.05 mm. to the right, the drum 12 itself being moved 0.5 mm. to the right. In similar manner, when turning the drum 12 a full rotation in the opposite direction, the spindle 1 will be moved 0.05 mm. to the left. The longitudinal movement of the measuring spindle 1 thus only amounts to one-tenth of the movement of the measuring drum. If the measuring drum 12 is divided at its circumference into 50 divisions in the usual manner, the guide sleeve 3 being provided with a graduation 17 indicating the movement of the measuring spindle 1 on each rotation of the drum, the said graduation being shown diagrammatically in Fig. 2 opposite the drum, it is thus possible with this micrometer exactly to read longitudinal movements of 0.001 mm. of the measuring spindle, corresponding to the turning of the measuring drum from one division to the one next following.

On account of this great difference between the longitudinal movement of the spindle and the longitudinal movement of the measuring drum which latter movement is limited by the length of the screw thread, the micrometer referred to would have only a very small range of measurement, about 2 to 3 mm., if the anvil-spindle 2 were rigidly secured in the frame 5. In order to obtain a range of measuring sufficient for practical purposes it is necessary to make also the spindle 2 adjustable. For this purpose the said spindle 2 is provided with three lugs which may be brought into engagement with corresponding notches 19 in the guide sleeve 4. The lugs consist of three plane disks 18 which in the instance shown have similar shape, as illustrated in Fig. 4, and exactly equal thickness, for instance 1 mm. Each disk 18 is provided with a hole 20 so that it may be pushed onto the spindle 2, and it is prevented from turning on the spindle by longitudinal keys on the spindle which keys engage corresponding notches 29 in the disk. The three disks 18 are placed on the spindle so as to form lugs alternately directed in one and the other direction. In Fig. 1 the two outer disks are thus directed upwards whereas the middle disk is directed downwards. The disks 18 are forced against one another and against a shoulder 22 on the spindle by a sleeve 21 on said spindle so that they are prevented from moving longitudinally as well as from turning on the spindle. Finally, a drum 23 resembling the measuring drum 12 is mounted on the spindle 2, all parts on the spindle being held together by means of a nut 24.

In similar manner the notches 19 are formed by plane disks 25 placed in a row abutting one another, the said disks having the shape shown in Fig. 3 and having the same thickness as the disks 18, i. e. in this instance 1 mm. Each disk is provided with a large central aperture which is not completely circular, there being left a segment 26 in each disk. The said disks are introduced into the guide sleeve 4 in such manner that the segments 26 arrive alternately on the one and on the other side of the longitudinal axis of the sleeve 4, a notch 19 being thus formed between each pair of adjacent segments. The notches of the two rows will thus be staggered by a distance of 1 mm. relatively to one another. The disks 25 are forced against one another and are retained in the guide sleeve 4 by means of a nut 27, the disks being prevented from turning by longitudinal keys provided in the guide sleeve, but not shown in the drawing, which keys engage corresponding grooves 28 at the circumference of the disks 25.

The disks 18 on the spindle 2 and the apertures in the stationary disks 25 have such shape and size that the spindle 2 may be freely moved in its longitudinal direction when turned in such position that the lugs 18 extend in horizontal direction and are thus disengaged from the notches 19. The spindle 2 may thus be moved to any such position that the lugs 18 arrive opposite corresponding notches 19, after which the spindle may be secured in such position by being turned a quarter of a full rotation, as with an ordinary bayonet-lock. The said turning of the measuring spindle a quarter of a rotation is to be made to the right in one position, to the left in the next following position, and again to the right in the succeeding position, and so forth. When, as in the present instance, all disks 18 and 25 have a thickness of 1 mm. and the lugs on the spindle 2 as well as the notches 19 are alternately located on the one and on the other side of the spindle, this spindle 2 may obviously be adjusted and secured into definite positions at a distance of 1 mm. from one another. In order to facilitate the said adjustment the guide sleeve 4 is provided with a graduation 30 divided into whole millimeters.

The disks 18 on the spindle 2 should preferably be at least two in number in order to obtain a symmetrical engagement of the lugs into the notches 19. Theoretically, it would of course be sufficient to provide a single disk for securing the spindle 2 in adjusted position, but when turning such single disk into a notch having exactly the same width as the disk itself, the spindle will be subjected to a comparatively heavy one-sided strain of flexure. This inconvenience is avoided by using two, three or more disks 18 which are alternately directed to the one and the other side.

When it is desired by means of the described micrometer to measure a piece of work, a rough adjustment of the spindle 2 on whole millimeters is first made by means of the described adjustment device. Afterwards the accurate adjustment of the spindle 1 is effected in ordinary manner by turning the measuring drum 12. The reading of whole millimeters is afterwards made on the graduation 30, and of tenths of a millimeter to the graduation 17, and finally, of hundredths and thousandths of a millimeter on the graduation at the circumference of the measuring drum 12.

By means of the described adjustment device for the spindle 2 it is thus possible to construct a micrometer having a very large range of measurement, in view of the possibility of increasing as desired the number of the disks 25 and thus also of the notches with which the lugs on the spindle 2 are to engage. Furthermore, there is of course no objection to selecting a somewhat greater thickness of the disks 18 and 25, provided that such increase of the thickness is not carried beyond such limits that the measuring steps of the adjustment device may be covered by the differential screw. In instruments which are to be given a particularly large range of measurement it is thus suitable to provide two or more adjustment devices having different measuring steps.

The machine for accurate measuring illustrated in Figs. 5 to 9 shows such an application of the subject of the invention. The two measuring spindles 31 and 32 of the machine are adjustably journalled in supports 33 and 34 respectively. The fine adjustment of the measuring spindle 31 is effected by means of a differential screw 35, for instance of a construction similar to that described above with reference to Fig. 1. In addition, however, the two supports 33 and 34 are adjustable in the longitudinal direction of the measuring spindles by means of adjustment devices of the construction above described.

Two shafts 37 and 38 preferably hollow are rotatably journalled in the frame 36 of the machine. The said shafts are placed in alignment with one another, and in the embodiment illustrated the left-hand end of the longer shaft 38 engages a corresponding bore in the right-hand end of the shorter shaft 37. Cranks 39 and 40 are secured to the ends of the shafts projecting outside the frame, by means of which cranks the shafts may be turned independently of one another. Spring-actuated pins 41 and 42 are journalled in the cranks, which pins are capable of engaging holes in the stationary frame, for locking the shafts in adjusted positions. Both shafts are located in a trough-shaped channel 43 in the frame, which channel is open at the top and which may preferably be filled with oil for the purpose which will be explained here below.

Disks 44 are placed on the shaft 37 which disks project alternately to one and to the other side and which may have, for instance, the same shape and be prevented from moving longitudinally and turning on the shaft by similar means, as the disks 18 in Fig. 4. Disks 46, which may have the same shape and be prevented from rotating in the same manner as disks 25 shown in Figs. 1 and 3, are mounted between sleeves 45 in the lower portion of support 33, said sleeves surrounding the shaft 37 and being shrunk into support 33 and retained in position by means of nut 61, as shown in Fig. 8. In the embodiments illustrated, five disks 46 are shown. These disks have the same shape as the disks 25 in Fig. 3, and the segments left at the edge of the apertures of the disks, which segments form the notches co-operating with the disks 44, are also in this instance located alternately on the one and on the other side of the shaft. When the shaft 37 is turned into such position that the projecting portions of the disks 44 may pass the segments of the disks 46, it is thus possible to move the support 33 into desired position, when it may be secured in the adjusted position by turning the shaft 37 a quarter of a full rotation to the right or to the left. The engagement between the disks 44 and 46 thus produced is facilitated by all disks being immersed in oil. Moreover, by means of the oil, variations in temperature which may occur, will become distributed as uniformly as possible to all disks.

In similar manner disks 47 projecting alternately to the one and to the other side are placed on the long shaft 38, said disks co-operating with notches formed by five disks 48. These latter disks are held together for instance by means of a screw 60, the two outer disks extending upwards and forming the support 34 for the measuring spindle 32. Said spindle 32 is actuated by a spring 49 and presses against the pointer 50 which turns on the pivot 64 and is actuated by a spring 65 and is supported by the arm 66 of the scale 51, said arm being secured to the support 34, as shown in Fig. 9. The bearing pressure between the measuring spindle and the piece of work will be indicated by the pointer 50 on the scale 51 as will be clear. This pressure-indicating device, however, may of course be replaced by any other device for similar purpose, such as for instance a turning gauge, as in the Pratt and Whitney measuring machine, or a liquid indicator.

In the present instance it may be assumed that each of the disks 44 and 46 of the adjustment device for the support 33 has a thickness of 2 mm., and that each of the disks 47 and 48 of the adjustment device for the support 34 has a thickness of 10 mm. When measuring a piece of work the first rough adjustment is made in steps of 10 mm. by means of the right-hand adjustment device in Fig. 5, the support 34 being thus adjusted and secured in the required definite position. The support 33 is afterwards adjusted by means of the left-hand adjustment device in Fig. 5 on the required 2 mm. step, and is secured in such position by turning the shaft 37 a quarter of a full rotation to the right or to the left. Finally, the last precise adjustment of the spindle 31 is effected by means of the differential screw 35, when care should be taken that this screw is turned so far that the pointer 50 indicates the proper bearing pressure. The reading is afterwards made on several different graduations not shown in the drawing, in similar manner as above described.

In order to guide the supports 33 and 34 during their movement, there are provided guide channels 52 in the frame 36. The supports are provided with laterally extending arms 53 at the outer ends of which flat springs 54 or the like are secured, which springs slide in the grooves 52 when the supports are moved, it being necessary that the guiding means possess a certain flexibility or springiness in order to facilitate the engagement of the adjusting devices and in order that the positions of the supports, when the engagement has been effected, may be determined exclusively by the disks on the two shafts 37 and 38.

In order to obtain the large range of measurement of about 1 to 2 m. necessary in measuring machines of precision, the shaft 38 carrying the thick disks must have a considerable length. Such a long shaft with disks secured thereto having a comparatively heavy weight, even if the shaft is hollow or tubular, it is necessary in order to prevent the shaft from bending to support the shaft at one point or at several points. As shown in Fig. 5 pistons 55 movable in vertical direction are for this purpose provided in the bottom of the channel 43, the upper roof-shaped ends of which pistons serve to support the shaft 38. The pistons are actuated by springs 56 which tend to move the pistons upward, and the tension of which may be regulated by means of adjustment screws 57 in such manner that the pistons support the weight of the shaft 38 and of the disks secured thereto. When the support 34 with its ring-shaped disks 48 is moved past such a point of support, the piston is automatically depressed owing to the roof-shaped upper end of the same, again to be pushed upwards until it will again bear against the disks on the shaft.

The embodiments illustrated may, of course, be modified in several respects without departing from the principle of the invention. For instance, in the measuring machine according to Fig. 5 the measuring spindle 32 may be provided with an adjustment device having a smaller measuring step than that of the device 44, 46.

From the above description it will be understood that by locating the notches alternately to the one and to the other side of the spindle only half as long adjustment steps will be obtained, with a given thickness of the disks, as if the disks were located in a row only to one side of the spindle, in which case the step becomes equal to twice the thickness of a disk. By providing two rows of notches diametrically opposite one another the size of the steps is thus decreased to one half. It is obvious, however, that the circumference of the circle may be divided into still smaller portions, and that more than two rows of notches may thus be provided, and if also in this case the notches of the different rows are displaced relatively to one another by very small distances it will thus be possible to obtain adjustment steps of for instance 0.01 or 0.001 mm. corresponding to said small distances, so that even the most accurate micrometer screw may be substituted by a step adjustment device according to the present invention.

I claim:

1. In a measuring apparatus, the combination of a frame, a measuring spindle capable of adjustment longitudinally in said frame, at least one lug on said spindle, and lugs in said frame co-operating with said lug on said spindle, at least one set of said co-operating lugs being formed by plane disks of equal thickness placed in a row abutting one another, said lug on said spindle being adapted to engage said lugs in said frame by rotation of said spindle.

2. In a measuring apparatus, the combination of a frame, a measuring spindle capable of adjustment longitudinally in said frame, at least one lug on said spindle, and lugs in said frame co-operating with said lugs on said spindle, said lugs in said frame being formed by plane disks of equal thickness placed in a row abutting one another, said lug on said spindle being adapted to engage said lugs in said frame by rotation of said spindle.

3. In a measuring apparatus, the combination of a frame, a measuring spindle capable of adjustment longitudinally and of turning in said frame, lugs on said spindle projecting alternately in different directions, and lugs in said frame co-operating with said lugs on said spindle, and forming notches located alternately in different directions, at least one set of said co-operating lugs being formed by plane disks of equal thickness placed in a row abutting one another, for the purpose of effecting a simultaneous engagement of all of said lugs on said spindle with said notches in said frame when turning the spindle.

4. In a measuring apparatus, the combination of a frame, a measuring spindle capable of adjustment longitudinally and of turning in said frame, lugs on said spindle projecting alternately in different directions, and lugs in said frame co-operating with said lugs on said spindle, at least one set of said co-operating lugs being formed by plane disks of equal thickness placed in a row abutting one another, the lugs in said frame forming notches located alternately in different directions in a plurality of rows around said spindle, the notches of said different rows being staggered relatively to one another.

5. In a measuring apparatus, the combination of a frame, a measuring spindle capable of adjustment longitudinally in said frame, at least one lug on said spindle, lugs in said frame cooperating with said lug on said spindle, at least one set of said cooperating lugs being formed by plane disks of equal thickness placed in a row abutting one another, and a resilient support for said spindle in said frame.

6. In a measuring apparatus, the combination of a frame, a measuring spindle capable of adjustment longitudinally in said frame, at least one lug on said spindle, lugs in said frame cooperating with said lug on said spindle, at least one set of said cooperating lugs being formed by plane disks of equal thickness placed in a row abutting one another, and said frame forming a container for oil surrounding said spindle.

CARL EDVARD JOHANSSON.